US008832662B2

(12) United States Patent
Eade et al.

(10) Patent No.: US 8,832,662 B2
(45) Date of Patent: *Sep. 9, 2014

(54) RULES ENGINE FOR ARCHITECTURAL GOVERNANCE

(75) Inventors: Sean Eade, Princeton, NJ (US); Christoph Wienands, Portsmouth, NH (US)

(73) Assignee: Siemens Aktiengesellschaft, Munich (DE)

(*) Notice: Subject to any disclaimer, the term of this patent is extended or adjusted under 35 U.S.C. 154(b) by 179 days.

This patent is subject to a terminal disclaimer.

(21) Appl. No.: 13/466,315

(22) Filed: May 8, 2012

(65) Prior Publication Data
US 2013/0305224 A1    Nov. 14, 2013

(51) Int. Cl.
*G06F 9/44* (2006.01)

(52) U.S. Cl.
USPC .......................................................... 717/126

(58) Field of Classification Search
CPC ............ G06F 11/3684; G06F 11/3688; G06F 9/44589; G06F 11/368
USPC .......................................................... 717/126
See application file for complete search history.

(56) References Cited

U.S. PATENT DOCUMENTS

| 7,003,774 | B2 * | 2/2006 | Mugica et al. | 719/313 |
| 8,103,490 | B2 * | 1/2012 | Voirin et al. | 703/2 |
| 8,290,979 | B1 * | 10/2012 | Fernandez | 707/782 |
| 2009/0210858 | A1 * | 8/2009 | Son et al. | 717/121 |
| 2009/0300579 | A1 * | 12/2009 | Dutta et al. | 717/105 |

OTHER PUBLICATIONS

Architecture Governance, webpages, http://pubs.opengroup.org/architecture/togaf8-doc/arch/chap26.html, pp. 1-10, Apr. 16, 2012.
Governance, webpage, Wikipedia, http://en.wikipedia.org/wiki/Governance#Information_technology_gov, pp. 1-9, Apr. 16, 2012.

* cited by examiner

*Primary Examiner* — Li B Zhen
*Assistant Examiner* — Hui-Wen Lin

(57) ABSTRACT

A software architecture as designed is governed. A rules engine tests code for implemented architectural decisions. Deviation from designed architecture is detected by execution of the rules engine. To create the rules engine, the architecture is broken down into automatically testable architectural decisions. The decisions can be tested, allowing creation and application of the rules engine.

20 Claims, 8 Drawing Sheets

FIG. 8
| Rule | Code Link | Statistic |
|---|---|---|
| No SQL | Line 505 | 5 Violations |
| A only call C | Line 101 | 1 Violation |
FIG. 9
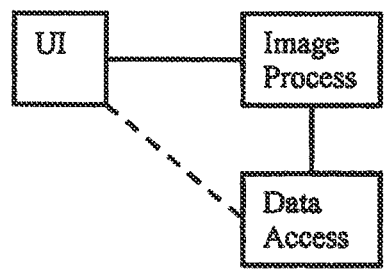
FIG. 10
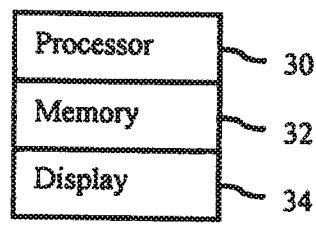

RULES ENGINE FOR ARCHITECTURAL GOVERNANCE

BACKGROUND

The present embodiments relate to a rules engine for programming. For large scale software engineering projects, management of software development is an ever increasingly difficult challenge. Making decisions, granting powers, and verifying the quality and performance of multiple areas of the development lifecycle are important. Governance is management of these aspects or the principle processes and practices determining the operations of a system's enterprise environment.

Part of software engineering projects is governance of software architecture. During the realization of a system's architecture, programmers may stray from the intended software architecture. Much management time is dedicated to determining what architectural decisions are made during the design phase of a system's software, and how the decisions may be systematically managed. As the software is created, the implemented architecture may deviate from the designed architecture in undesired manners. Such deviation may be difficult to identify or track.

SUMMARY

Systems, methods and non-transitory computer readable media are provided for governing software architecture as designed. A rules engine tests code for implemented architectural decisions. Deviation from designed architecture is detected by execution of the rules engine. To create the rules engine, the architecture is broken down into component concepts, such as decisions or features. The component concepts may be tested, allowing creation and application of the rules engine.

In a first aspect, a system is provided for governing software architecture as designed. A memory is operable to store code and a plurality of rules. The rules correspond to classification, layering, abstraction, components, and links characteristics of the software architecture as designed. The code is programmed to implement at least part of the software architecture as designed. A processor is configured to apply the rules to the code. The application of the rules tests the code for differences from the software architecture as designed and the software architecture as implemented in the code. The differences in the classification, layering, abstraction, components, links, or combinations thereof are identified.

In a second aspect, a method is provided for governing software architecture as designed. Artifacts representing a software program to be verified are received. A processor tests the artifacts against an architectural specification using a set of rules. A result of the testing is output.

In a third aspect, a non-transitory computer readable storage medium has stored therein data representing instructions executable by a programmed processor for governing software architecture as designed. The storage medium includes instructions for receiving a program, executing rules against the program, the rules comparing different aspects of an architecture of the program to an expected architecture, and indicating portions of the program violating the rules.

Any one or more of the aspects described above may be used alone or in combination. These and other aspects, features and advantages will become apparent from the following detailed description of embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

FIG. 8 is an example list output to show rules violations;

FIG. 9 is an example graphical representation showing a simple architecture with a link violation; and FIG. 10 is a block diagram of one embodiment of a system for governing software architecture as designed.

DETAILED DESCRIPTION OF EMBODIMENTS

Figure 1:
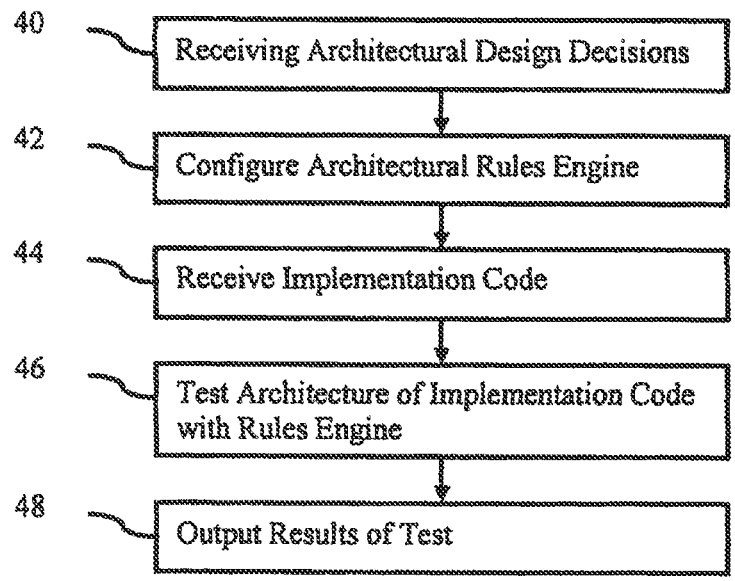
FIG. 1 is a flow chart diagram of one embodiment of a method for governing software architecture as designed.

Too often software development projects are faced with situations where the implementation diverges from the original architecture and design descriptions of the system. Architectural drift is quite common when there is a disconnect between the design team and the development team(s), and also when there is a large-scale and ongoing development effort creating the system's software. During the development of large, complex, or other software systems, a gap between the conceptual architecture incepted and documented by the software architects and the actual architecture of the developed software may manifest. To control the gap, the architecture is specified in a way that the architecture becomes testable. The implemented architecture may be inspected, measured, or otherwise tested against the system's design description.

Once the architectural decisions have been phrased in a testable way, the architecture may be governed and improved more effectively based on the evidence produced by implementation artifacts. Artifacts are code (e.g., source code) or models transformed into an executable program during the build process. Evidence-based architecting is aiming for a testable design, gathering the evidence, and improving the design based on this evidence.

To facilitate architecture governance of implementation changes, a rules engine tests and verifies the system's implementation against the architectural description created by the architects. Architecture governance is used to manage the change between implemented and designed architecture of the software. The adherence to envisioned architecture, evolution of the architecture over time, and/or difference between defined architecture and the code implementation are detected. A set of rules, derived from the architectural decisions, is applied continuously during the implementation phase across the code to determine the code's ability to satisfy the system's architecture.

The results of application of these rules are displayed. Architectural change or difference is output to the architecture and development teams, who will in turn use the change information to analyze the system's architecture. This output may be done in the form of an architecture dashboard. An architecture dashboard may display static representations of the system's architecture, presenting the architectural models of the system to both the architects and the development team. Specific data of the architecture that may be useful when diagnosing the correctness of the system's overall architectural description may be presented. The rules engine highlights architectural mismatches and/or places where things have changed since the previous snapshot of the architecture, depending on the chosen criteria. Specific aspects of the architecture that are relevant to the architect may be presented.

Using either application of the rules engine or presentation of the results from application, adherence to the envisioned architecture of a software project may be enforced through evidence-based architecting. Architecture reverse engineering may be used to highlight, generate and monitor architectural descriptions and models of a system's software and frameworks for studying configuration management, bug tracking, and release management activities of software development.

FIG. 1 shows a method for governing software architecture as designed. The method is implemented by the system of FIG. 10 or a different system. The method is provided in the order shown, but other orders may be provided. Additional, different or fewer acts may be provided. For example, acts 40 and/or 42 are performed at separate times or not performed as part of application of the rules engine. As another example, acts associated with different dashboard outputs are provided, such as acts for outputting code and rule identification and acts for outputting graphical representations of architectural changes.

In act 40, architectural design specifications are received. The design specifications are received by data entry, such as selecting from a list of redefined rules. The rules engine includes fields or variables for different characteristics of an architectural design. For example, a user input device and associated user interface are used for inputting one or more characteristics of a particular architectural design specification. As another example, a database or data representing characteristics of the architecture are received by transfer from a memory or over a network. In yet another example, the design specifications are received as part of entries into a program for architectural design. The architectural design team may use a program to guide design. The program may be configured to output to or configure the rules engine for testing implementation of the architecture.

The architecture is created as part of a design process. The design process may be an initial design, such as determining an architecture from scratch. Alternatively, the architecture is reused and adapted from an existing source. For example, the architecture from a similar or previous software system is used. The design team may edit the architecture to design a new or updated software system. As another example, existing code is reverse engineered to generate the starting point of the architecture. The architect fine-tunes the architectural design. The architect may add specifics and details to the data extracted from the code, and this may be stored for further use. By tracking changes over time, it is possible to find the stable and unstable architectural decisions.

The design specifications indicate rules for all testable software architecture to be used in the rules engine. During the architecture design phase, the architecture and detailed design are conceptualized and created. Descriptions are prepared, rules are created, and monitoring techniques defined. Architectural views may be created and input.

Since software architecture may be complex, the architecture is broken down into a plurality of design decisions about the architecture. The design decisions are received as the architecture.

The design decisions may be created by the design team. Alternatively or additionally, design decisions are selected from an available library of design decisions. Template decisions that may be programmed to implement specific design criteria may be used.

Rules are associated with the design decisions. For existing or template decisions, corresponding template or existing rules for testing of the architecture are provided. For newly created design decisions, corresponding rules may be created as well.

Architectural decisions are decisions that may concern the system as a whole, or one or more of the core elements of the system. Rather than being code to perform a given function, the architecture represents interaction between different components or generally operation of one or more components of the software. The architectural decisions are for generalized representations of the software.

Architecturally significant decisions that may have a major impact across the entire project are monitored. Other decisions may be monitored. These decisions and their rationales are captured and managed to better understand the architecture and implementation of the system.

Identifying these decisions, knowing when the decisions are being taken, capturing the reason for taking the decisions, the expected outcome of decision implementation, and/or the relationship of decisions to other decisions may be important aspects to be incorporated into the design and implementation of a system's development efforts. By extending the existing practices for building architectural descriptions and adding enforcement steps to the architecture phase of software projects, the design process may be supported.

To create rules to test architecture, verifiable design decisions are part of the architectural description of a system. The rationale for the decisions may be captured, such as by providing a notes or rationale field. The rationale may be used to elaborate the cause and affects of these decisions for later reference. It may be important to capture the rationale behind design decisions throughout the architecture and design phases (even those decisions that do not eventually make it into the design of the system). Any changes made during the implementation to the design decisions and/or rationale may also be captured. These decisions may be presented to the architect and the developers via the dashboard or other output, providing vital information for the purpose of certain architectural elements.

The design decisions may be conceptualized at different levels related to verification. Broad concepts of architecture may be difficult to verify or test. For those decisions, the decisions may be broken down into more fine-grained decisions. The break down continues in order to provide design decisions that may be tested against the software's code. By focusing on these architectural design decisions, it may be possible to link architectural concepts and their decisions to implementation aspects of the system, such as code artifacts. The affects changes to these artifacts have on the architecture of the system may be monitored and identified. Changes in the code may be detected and related back to the architectural decisions. Verifiable decisions allow for determination of whether the system's software satisfies the architecture or not and whether the decisions cause problems with other areas of the system's design.

Architectural decisions may be classified into different groups. Any classification may be used. In one example, the decisions are classified as provided in Table 1:

TABLE 1

Architecture Decision Classification

| Decision type | Examples |
| --- | --- |
| Architectural style | Client-server, distributed computing, modularity, interfaces, Dependencies |
| Technology decisions | Platforms, Programming languages, Web Services |
| Pattern selections | Adapter, façade, proxy, composite, component decomposition |
| Decisions supporting quality attributes | Performance, security |
| Data management decisions | Database, data persistence, DAO |

Other classifications of decisions may be used. Concept-Requirement-Decision (CRD) is a strategy of dissecting the requirements of a system into individually manageable concepts, which are traced back to requirements and enriched with architectural decisions. A concept may be a feature of a system (an alternative name is a feature-requirement-decision tree). As concepts are discovered, additional requirements are taken into account, which in turn lead to a refinement of those concepts. Refinements generally result in new, subordinate concepts, so that the end result is a tree of CRD nodes. Decisions are captured and their rationale documented. Each decision is linked to a requirement of the system, and this can be used to facilitate and manage traceability of the requirements through the architecture to code during verification and validation.

Figure 2:
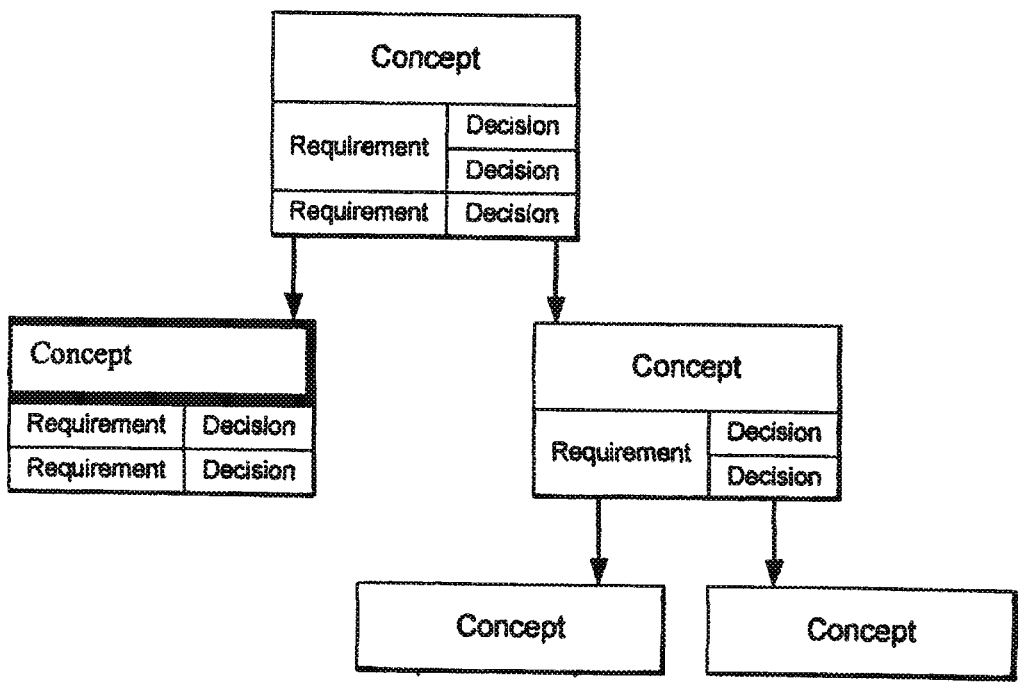
FIG. 2 is a diagram of one embodiment of a tree representation of architectural decisions.

Each node in the resulting decision tree documents a concept, related decisions and rationale. FIG. 2 shows an example CRD tree. Top level decisions are broken down into smaller, more manageable decisions, and this decomposition continues until the decisions may be linked directly to the code artifacts of the system. This repeated decomposition may eventually result in a tree of concept, requirements and decisions that link requirements of the system to testable architectural decisions. The testable architectural decisions may be mapped directly to some testable aspect of the system's code.

Each decision has a unique identifier, and the context of each decision is documented for understanding when being considered by the system's architecture team and development teams. All but the top architecture decision of each branch of the tree is nested beneath a higher-level decision. For each decision to be satisfied, all higher-level decisions are to be satisfied. If any decisions are modified, then the lower-level decisions are revisited to check for relevancy and consistency. Higher-level decisions are to be meaningful and correct so that the low-level testable decisions may be constructed correctly.

For evidence-base architecting, an architecture description is to be automatically verifiable. The architecture decisions have the ability to be inspected and measured to determine their affects and outcomes. Once the architecture is verifiable by automation or computer checking, the architecture may be governed and improved more effectively based on the produced evidence.

Architecture descriptions may include a number of diagrams plus descriptive text. Some testable decisions may be associated with classification, layering, abstractions, components, links, authentication, other categories, or combinations thereof. The testable decisions may be used to indicate differences between the implemented architecture and the architecture as designed.

Classification as an architectural design decision indicates a functionality. Different components of the architecture perform different generalized functions. For example, a user class is provided. The user class addresses user identification, use history, and other characteristics of the user for a system. Different functions or classes may use or provide information from or to other classes. To test code, a corresponding rule may measure a number of calls outside the functionality. Calls sent by the class and/or sent to the class are measured. Vertical and horizontal "buses" may indicate structural bottlenecks.

Layering as an architectural design decision indicates responsibilities of different types of operations. A layering diagram may represent the grouping of components to perform different types of responsibility. The components of the application are grouped together to keep similar functionality together in separate layers, where the functions may be managed by the architect.

The layering may be tested. In one embodiment, the layering is tested using a direction of communications between layers. Layered architectures may forbid upward references between layers. Circular references are also considered violations. In some cases of strictly layered architectures, the access to certain lower layers may be forbidden by non-neighboring layers as part of the architecture. Calls or other dependencies between the individual layers of the application may be monitored. Violations of layered architecture may be indicated by lower-layer components depending on upper-layer components. By testing for calls or use of variables, rules for testing layering are provided.

Abstraction as an architectural design decision indicates a mapping, such as a database mapping. Rather than relying on direct calls to a database or component, abstraction provides for an intermediary handling the calls to the database or component. For example, an object relational (OR) mapper, such as Hibernate, is used to create an abstraction layer between business logic and a database. Calls to the database are wrapped through a data access layer. The abstraction may reduce the effort needed to create the logic of the application. The data access logic is abstracted away from the logic of the application so that the software does not depend on a particular persistence technology. One, two, or more rules may result, such as a rule about direct access to the database and a data abstraction rule.

Rules may be provided for testing the abstraction. The code may be examined for any calls to a database not using the database mapping or other abstraction. Direct access to the database or other abstracted component is not permitted. By searching for call terms by code not associated with the abstraction, any violations of this architectural decision may be identified. For example, direct SQL statements of the access layer other than by the component handling the abstraction function violate the architectural abstraction requirement. Direct access by SQL statements is avoided.

Components as an architectural design decision indicate code blocks. For example, a graphical representation of the code may include a plurality of blocks. Each block is treated as a component. The block may represent a function, layer, class, process, temporal segment, or other division of the code.

Rules may be provided for testing the component implementation of the architecture. The size, coupling, complexity, usage, or duplication of components may be tested. The size may be tested by a word or line count. The coupling may be tested by calls to other components. Calls to a component not linked to the component violate the architecture. Complexity may be tested by the number of calls, processing requirements, word or line count, or combinations thereof. The duplication may be tested by calls for the same information by different components and/or identification of similar coding. Where a threshold number of calls or percentage of calls by a given component is the same as calls by another component, duplication may be indicated. Dependencies may indicate component deviation from the architecture. For example, one or more of library access, uses relations, inheritance, call procedures, callbacks, invocations, includes relationships, assigned-to relationships, or dynamic binding are tested.

A link as an architectural design decision indicates a communications channel or interface. For example, a graphical representation of the code may include a plurality of components linked together. The connections between components are links. The connector diagram indicates class associations and type of connectors. Since communication mechanisms are an important aspect for web services, those aspects of communication between the clients and the server are represented with a communication view of the architecture.

Rules may be used to test links for deviation from the designed architecture. The interfacing between components is tested, such as testing for the type of connector, connection to the appropriate blocks (e.g., class associations), or bandwidth of the connection. In one embodiment, the links are tested for asynchronous communication (if present), synchronous communication (if present), format, or specific types of messages.

An authentication characteristic as an architectural design decision indicates access. Access may be restricted to different components, functions, layers, or other part of the code. For example, communication and/or data transfer between components or subsystems for web services uses authentication or authorization limitations. User or component rights are limited.

Rules may test for violation of the authentication characteristic of an architecture. User or component rights limitations may be tested by looking for calls to restricted information by components without access rights. The location of services, data, or code to be protected in a directory denying anonymous users may be tested. The use of built-in authentication may be tested.

Other design decisions may be tested. For example, a development view represents the architectural design of physical deployment. The physical deployment of the system shows how the different components are mapped to the physical hardware (e.g., the server and the clients). The assignment of runtime component instances across the system's architecture may be tested. The physical resources assigned to implement different functions are tested. The allocation, behavioral and/or structural assignments may be tested for deviation.

As another example, design decisions related to execution may be tested. The mapping of the system's functionality to runtime platform elements, such as processes and shared libraries, is tested.

In another example, design decisions related to data scheme may be tested. The tables and/or relationships between tables are tested for deviation.

Combinations of architectural design decisions may be tested. One or more tests for different types of design decisions may be performed. The tests may not be associated with types of decisions, such as providing tests based on what is tested rather than an arbitrary categorization. A given test may test for multiple, different categories. For example, a test for a call to a database may indicate violation or conformance with the architecture for abstraction and linking. As another example, cyclical dependencies may be tested in various code elements, such as classifications, files, packages, or data access.

Other aspects of the programming environment may be tested. For example, changes associated with more than a threshold number of programmers may be tested. As another example, a threshold number of changes for a same issue, artifact, or part of code may be tested. The tests indicate high-risk operation. High-risk operation may indicate a need to redesign the architecture or for input from a supervisor to avoid problems. In one embodiment, tests for specific code operation are also provided. Example inputs are applied to the code for comparing an actual output to an expected output. The coding is tested rather than the architecture.

Tests for control, versioning and testing of third party dependencies may be provided. The testing may limit programmer access to different functions or prevent duplication of effort.

The rules engine is based on the architectural design decisions. By breaking down the design decisions into testable parts, the rules for testing may be provided, such as through selection.

In act 42, the architectural rules engine is configured. The configuration incorporates the received architectural design specifications. The rules to test for the design decisions for a given program are gathered for implementing the rules engine. One or more rules for each design decision are identified.

The configuration occurs by creation of the rules. A library of rules may be provided, such as different rules associated with different types of design decisions, different design decisions, or with any other organization. The selection of a design decision lists the associated rules. The programmer may select one or more of the rules from the list for testing the decision. A default rule or rules may be provided for any given design decision. One or more rules associated with an existing design may be presented for selection or approval. Alternatively, the creation is by programming from scratch. For example, a programmer designs a rule to test a given design decision. Combinations of configuration by selection or programming from scratch may be used.

The configuration may include configuring the created rules. A given design decision is linked to a specific design. To test the implementation of the specific design, the rules are configured. Each rule may be associated with one or more variables. For example, a rule for testing a link includes variables for the end points or components of the link, variables for the type of link, or variables for other characteristics. The programmer selects options or inputs the values for the variables. Alternatively, the different rules to be created are associated with different values for the variables.

The rules engine is configured to test implementation of the architectural design. The configured rules engine represents an architectural model to be followed. Applying the rules engine as the software is created continuously monitors the software during development. The rules engine accesses information of the software for testing. The architectural model may take different forms, depending on the view of the system and the rules configured from the design decisions.

The rules and corresponding design decisions represent different characteristics of the architecture. These characteristics may be mapped to modeling.

Configuring the rules engine provides evidence-based architecting. In an example embodiment, a rules engine is configured for a medium-sized, distributed system for automatically diagnosing and treating problems that occur on client machines. To configure the rules engine for testing implementation, the architecture decision tree is created. The system's infrastructure is realized as a client-server architecture.

Figure 3:
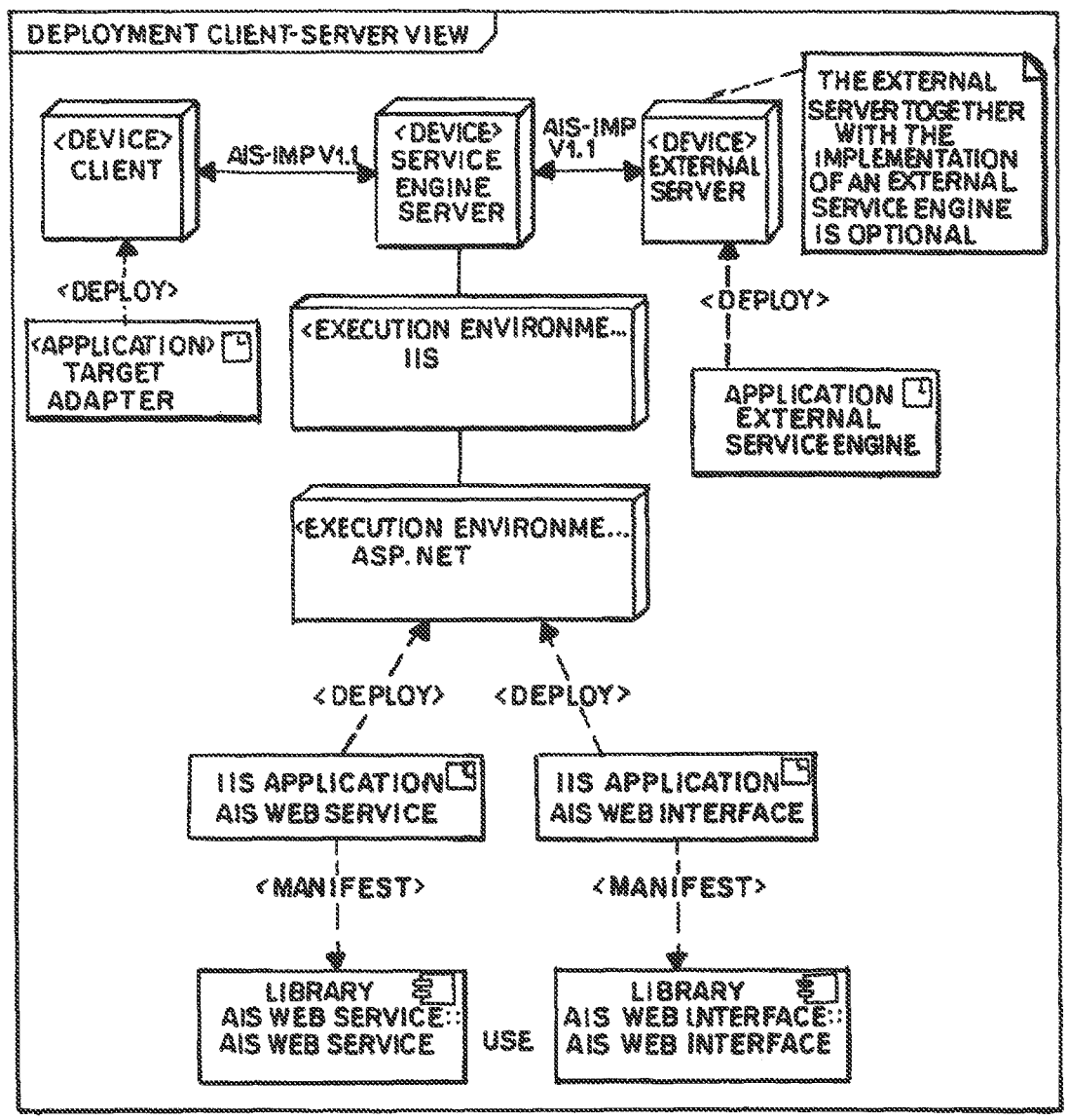
FIG. 3 is a block diagram representing a component and link architecture of an example software project.

FIG. 3 shows a client-server architectural view of the system. The service engine server receives client-submitted incidents and in return sends commands for execution. The service engine server device in turn may act as a client when sending diagnosis or solution actions to the external server for remote execution. The client-server pattern allows for flexible deployment, and centralized processing and control.

The service engine server is a combination of protocol and data specifications, web service implementations, and an administration web interface. These all represent significant architectural decisions made to facilitate the serving of data and services through the system and to the outside world. Most of the service engine server functionality is accessible through web services using the SOAP over HTTP protocol. Web service interfaces are specified by two protocols. One specifies how target adapter clients communicate with the service engine, and the other defines a set of services and data structures for managing incidents and importing and exporting of fault knowledge.

Some web services provided by the service engine server are to be protected through an authentication and authorization mechanism. This mechanism is implemented in two parts. When a request is made to a protected web service, first a HTTP module, hooked into the ASP.Net pipeline, performs a basic authentication challenge/response step with the requesting web service client, using HTTP basic authentication. Once the credentials are submitted to the service engine server and the ASP.Net session is set with the appropriate user credentials, an authorization SOAP extension verifies the given user's rights against the privileges required by the invoked web method. This SOAP extension is hooked into the ASP.Net pipeline as well. Web services that need protection are located in directories that deny anonymous users and specify no built-in authentication methods. The privilege level of web methods is set individually using attributes on web service methods.

The system has a collection service that provides the functionality of the service engine server to target adapters, namely receiving new incidents, requesting diagnoses, and providing treatments. This collection service is able to process many requests per second. While individual messages are comparably small, the component analyzing and diagnosing incidents may touch thousands of objects and evaluate potentially thousands of diagnosis rules. Processing performance may be crucial. Additionally, the upload service provides optional functionality for attaching files to incidents and uploading them to the service engine server. The upload service allows for long-running uploads, which may be paused and resumed at any point in time. The action receiver service allows for execution of diagnoses and solutions on external remote service engines rather than on the originating target adapter.

Figure 4:
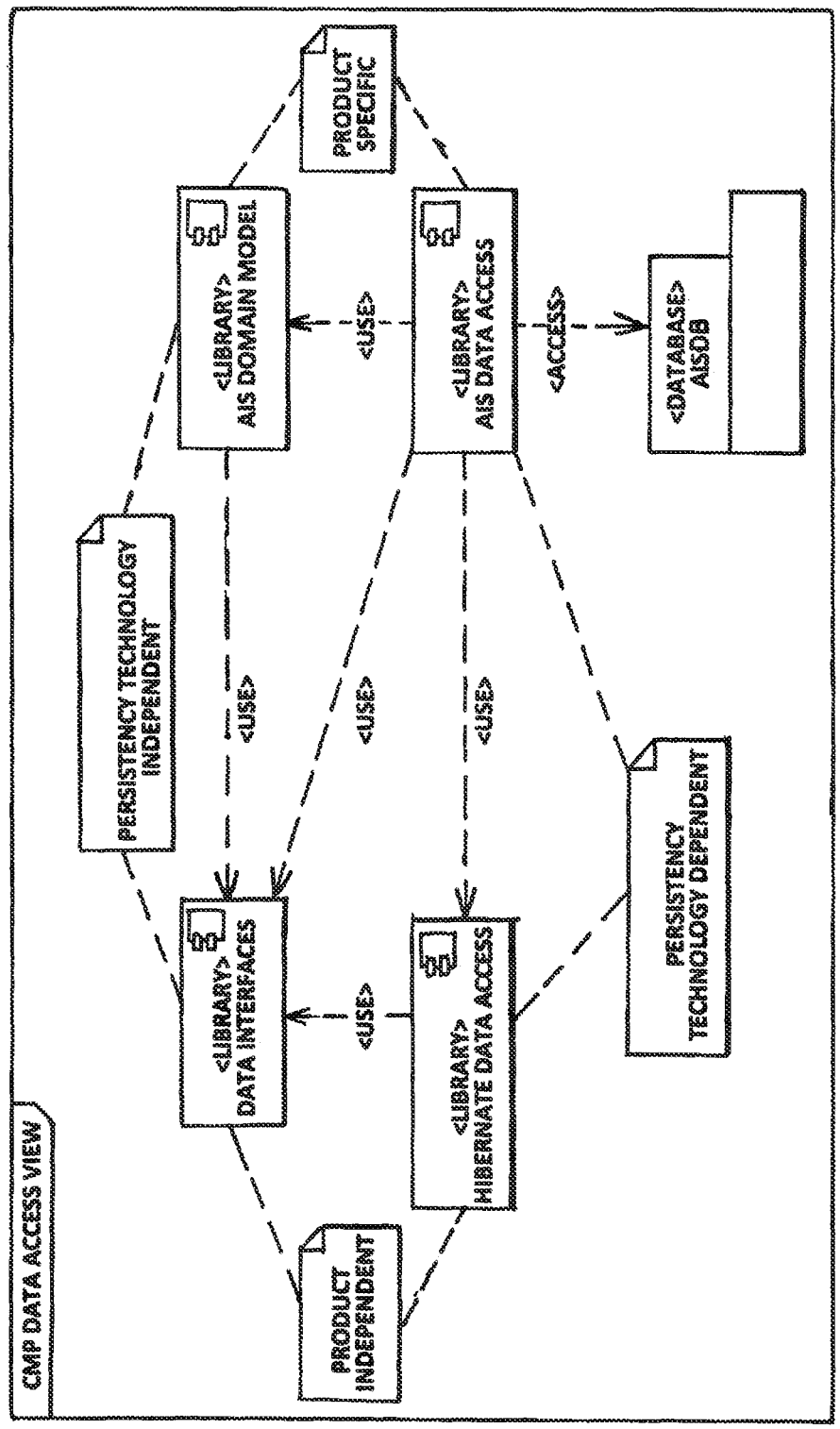
FIG. 4 is a block diagram representing a data access view of an example software project.

Data access is another architectural feature of the system. A data access layer utilizes NHibernate as an abstraction to manage database connections to the database. Any application requiring data access generally accesses data through interfaces. During the start-up phase of an application, concrete implementations of data access components are instantiated and provided to the application (mechanism is application-specific). In production systems, these components allow for accessing the databases hosted on a SQL server instance. Dividing concerns between product-independent and product-specific persistency technology dependent and independent components, decreases coupling through abstraction layers and allows for substituting individual components, when necessary. FIG. 4 shows a data access view of the system.

To improve system performance when searching and retrieving knowledge objects from the database, the data is divided up into groups, and the database is designed to reflect this partitioning. The database is grouped into three parts, depending on the level of access frequency. Transactional data has tables with high frequency of updates and inserts. Knowledge data has mostly static data required for incident analysis. Supporting data has additional data that does not belong into either of the transactional or knowledge data groups.

The system optimizes use of persistent knowledge objects. Without this optimization, NHibernate may load every knowledge object for every request again and again. Since knowledge objects are mostly static, an ASP.Net second level cache is used to cache all knowledge objects of the system. An expiration mechanism, also provided by ASP.Net, regularly polls the database for changes that have occurred in any of the knowledge tables. The second level cache may then invalidate the cached knowledge objects as soon as such a change has been detected.

The architecture described above may be broken down into testable design decisions. Table 2 shows example architectural decisions for the system, labeled the AIS system. Each of these decisions is made in response to a specific requirement of the system. The decisions address certain architectural and project-specific concepts.

TABLE 2

AIS Architectural Decisions

| Concept | Requirement | Decision |
|---|---|---|
| Layered Architecture | The system shall be highly maintainable, and encourage reuse. | The architecture will be layered, and each component will be assigned to a layer. The following layers will be maintained within the server application: UI (web interface) Protocol (service interface) Business Logic Data Access Cross-cutting utility |

TABLE 2-continued

AIS Architectural Decisions

| Concept | Requirement | Decision |
| --- | --- | --- |
| Dependencies | The system shall contain no compile to upper layers, managing references between layers to avoid circular dependencies | The layering of the application will be hierarchical, and USE references from lower layers will be prohibited to higher layers. |
| Client-Server Architecture | The system shall provide a flexible deployment, with centralized processing and control. | The Client Server architectural style will be used to handle the control and central processing mechanisms of the application. |
| Web Services | The system shall support interoperability with various client platforms | Use standard web service protocols (SOAP 1.1) and HTTP. |
| Web Services | The system shall use contract-first service and messaging interface to ensure stability. | All web services must be based on explicitly defined contracts written in WSDL & XSD. |
| Web Services | The system shall provide a reusable web service binding mechanism. | All the web service client and web service server-side interfaces which are generated from web service specifications "WSDL & XSD", are encapsulated in a reusable assembly. |
| Message Identification | The system shall maintain network reliability by providing services that can cope with resubmitted messages after transmission failure. | All service methods will be idempotent. The client-server protocol is designed in a way that the server can identify resubmitted messages, e.g. through message IDs. |
| Data Persistence | The system shall provide filtering, sorting, and analysis of its persisted data. | Use a database because it is optimized for filtering, sorting and analyzing. |
| Data Persistence | The system shall support the use of different persistency technologies and databases. | An Object Relational (OR) mapper will be used to create an abstraction layer between the business logic and the database, thus reducing the effort needed to create the business logic of the application. The data access logic will be abstracted away from the business logic of the application so that it does not depend on a particular persistence technology. |
| Data Persistence | The system shall implement a data access layer for managing the interaction with the database. | Use NHibernate as the Data access layer because developers are familiar with it and it's a free platform |
| Data Persistence | The system shall implement a mature testing platform, particularly for testing the data access layer. | The Data Access (DA) layer will be split up into 4 assemblies Data Access interfaces, AIS Domain Model, NHibernateDataAccess and AIS NHibernate Data Access Data Interfaces and NHibernateDataAccess assemblies are reusable for other projects. AIS Domain Model and AIS NHibernate Data Access are product-specific. The Business logic is then developed against the domain model and the DA interfaces, providing abstraction from both the Database and also the NHibernate |

TABLE 2-continued

AIS Architectural Decisions

| Concept | Requirement | Decision |
|---|---|---|
| | | OR mapping technology. For unit testing, NHibernate Data Access & AIS NHibernate Data Access can be replaced with fast in-memory implementations. |
| Data Access Session Handling | The system shall isolate the sessions of concurrent web service requests from one another. | Use the Session per Request pattern. The data access layer provides a first-level cache for persistent data in the form of a data session. With every web request a NHibernate session is started, a transaction is created, and at the end the action is committed, and the session is destroyed. |
| Database Transaction Management | The system shall use transactions for all access to the database, to guarantee consistency of the data in the database. | Transaction handling is implemented in a custom ASP.NET HTTP module, which hooks into the ASP.Net HTTP processing pipeline and works in a cross-cutting fashion. |
| Security | The system shall implement a mature security mechanism to secure the web services against unauthorized access, while still providing interoperability with common client platforms. | Web services will use HTTP basic authentication mechanisms. This is supported by virtually every web services client library. |
| Security | The system shall manage access to its services based on its implemented security model, including the specified roles within the system. | Role based method level authorization is encapsulated in a custom ASP.NET SOAP extension, hooked into the SOAP processing pipeline. Furthermore, every web service method is annotated with a custom authorization attribute specifying the minimum required role level. |
| Data Export | The system shall provide a systematic, and easy to use, import and export mechanism for data into and out of the system. | Custom built, but reusable, data importing and exporting code is used to handle the transfer of data into and out of the system. |
| Data Export | The system shall track changes to the knowledge data over time | The export should be done in fine-grained units, not one binary BLOB, so that changes can be related to individual units. |
| Data Export | The system shall specify the format for knowledge exchange data in an easily accessible technology. | Data is exported/imported in the form of XML data. The "Knowledge Exchange Format" consists of a set of XSD files to allow for validation and tool support. |
| Data Import/ Export | The system shall support the import and export of data to multiple physical forms of repositories, (e.g. file-based or web service-base repository). | Read-write logics for particular repository technologies are encapsulated behind a common interface, so that the import/export logic, which performs inserts, merges and deletes in the underlying database, can be reused. |
| Performance | The system shall maintain high performance of the web services used for frequent access to a large amount of knowledge objects in the database. | The diagnostic logic relies on potentially several thousand knowledge objects. These knowledge objects are slowly changing. To prevent frequent loading from the database, knowledge objects are stored in a 2nd-level cache that is used by all |

TABLE 2-continued

AIS Architectural Decisions

| Concept | Requirement | Decision |
|---|---|---|
| Performance | The system shall maintain the integrity of the data in the 2nd-level cache, by expiring and reloading stall data. | web service requests, outside of the isolation provided by the 1st-level cache (the data session). Triggers in the underlying database will register any change to data in knowledge tables. An expiration mechanism, also provided by ASP.Net, regularly polls the AISDB database for changes that have occurred in any of the knowledge tables. The 2nd level cache will then invalidate the cached knowledge objects as soon as such a change has been detected (less than 2 s between actual change and invalidation). The next time knowledge objects are requested, knowledge data will be transparently reloaded into the 2nd-level cache and passed on to the diagnosis logic. |
| Performance | The system shall handle an ever growing amount of object numbers, and also frequent access of data in these tables | The database will be logically divided between tables with static data that doesn't change unless changed by an administrator, and data that frequently changes at run time (have frequent inserts, updates, etc.) For the tables where the number of entries grows continuously (transactional data), a purging mechanism will be provided so that the database size can be controlled. Filtering and sorting on the tables with transactional data needs to be supported by indexes. |
| Communication reliability | The system shall respond to all submitted incidents in fewer than 20 s, even if the Service Engine is currently receiving many incidents per second and therefore is under high load. | The AIS Incident Management Protocol is designed in a way that a client reports an incident, but does not necessarily expect an answer (further diagnosis or treatment) from the Service Engine right away. If the Service Engine is under high load, it can return a 'wait' message to the client and queue the processing of the submitted incident. If no further diagnosis or treatment but a wait message is returned, the client will poll the Service Engine after a delay specified in the wait message. |
| Communication reliability | The system shall support uploads of multiple GB, as well as interrupted and resumed uploads (e.g. after a client restart). | The AIS Upload Protocol is designed for chunked data transmission. Each chunk is individually numbered so that duplicate messages can be detected. A synchronization mechanism allows for resuming uploads by clients even if the last transmitted chunk is unknown. |
| Performance | The system shall enable the management UI be able to handle tables with tens of millions of records. | Grids in the UI must use custom paging and only load the objects that are displayed. |

Some of the architectural decisions may be more easily verified than others. Some of the decisions cut across the whole system, while others are more localized and address specific aspects of the design. The broader decisions may be broken down into smaller, more verifiable decisions that are directly linked to aspects of the system's code. In this way, rules may be created for execution on the code. The ability of the code to satisfy each of the decisions that depend on the decisions may be tested. The lower-level architectural decisions together verify the higher-level more abstract decisions and corresponding architecture. In alternative embodiments, one or more architectural decisions are not tested.

Figure 5A:
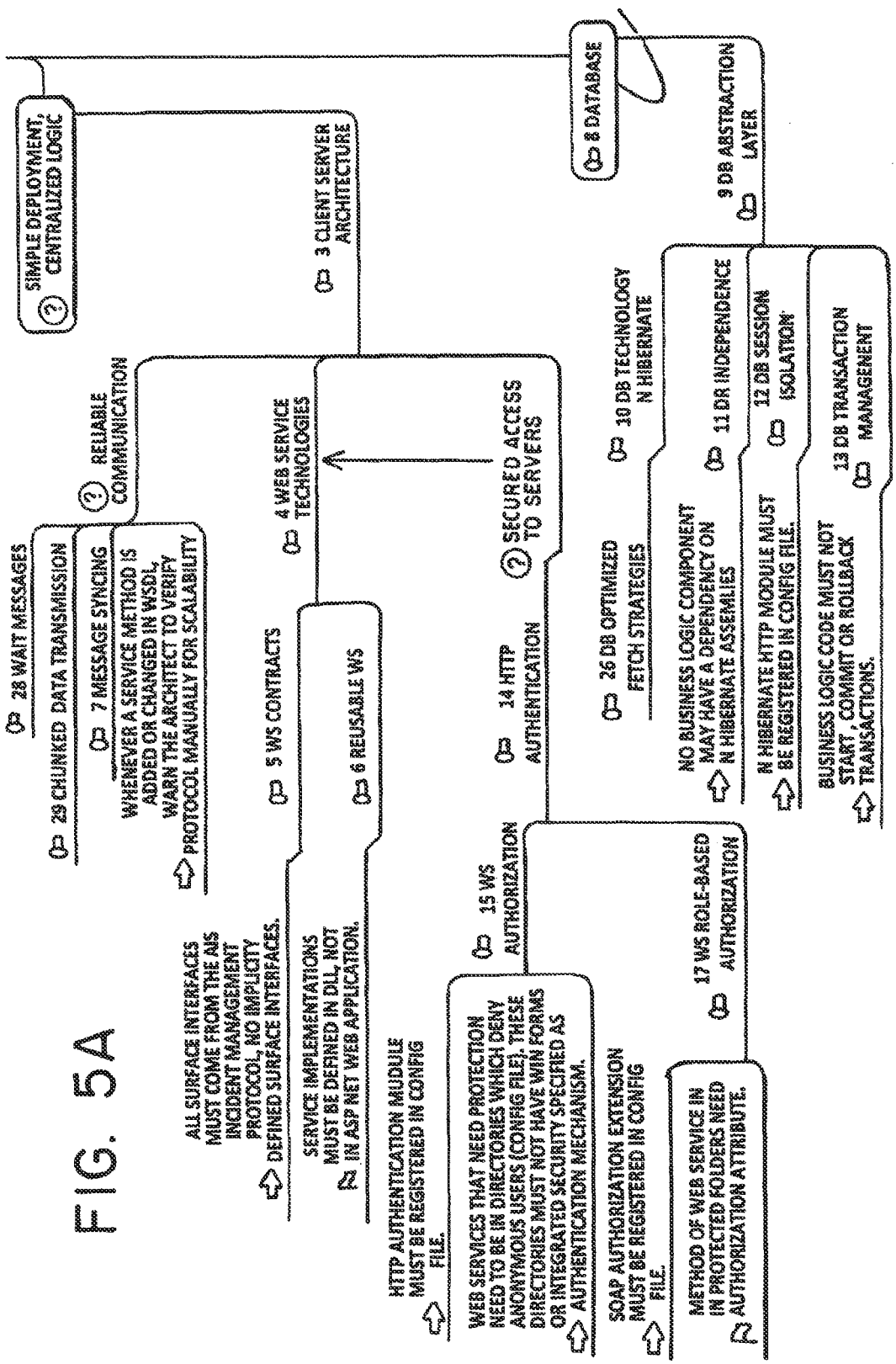
FIGS. 5A and B are an embodiment of a tree representation of architectural decisions of an example software project.
Figure 5B:
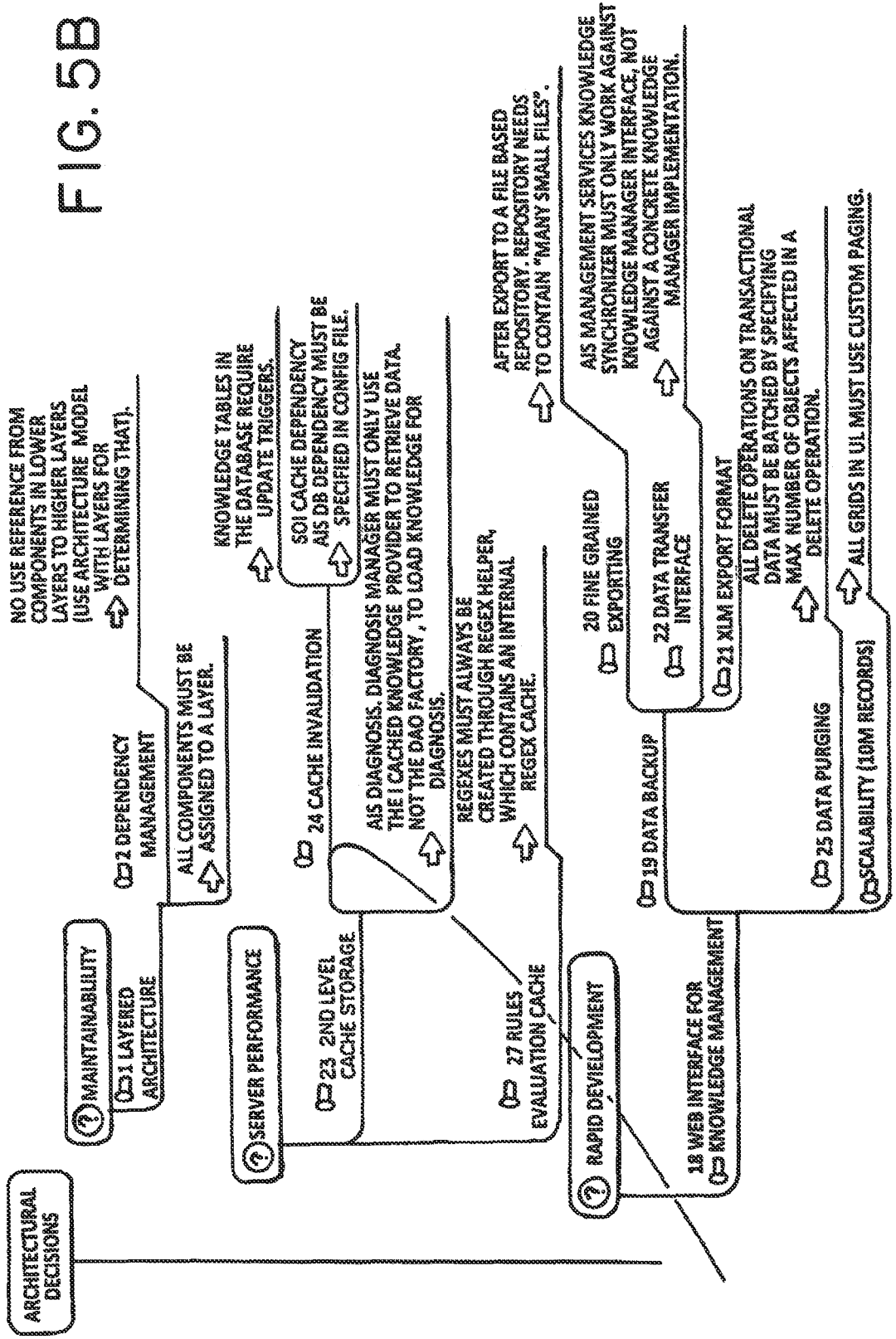

The breaking down of design decisions results in a tree of architectural decisions, with every branch of the tree ending with a set of rules that satisfy the entire branch. An example decision tree for the AIS system is shown in FIGS. 5A and B. The rules associated with the various decisions result in a data store of rules that are generic enough to apply to a system's code depending on the decisions to be tested. Architects may write or otherwise configure project-specific rules based on information extracted from the input sources—design decisions.

Referring again to FIG. 1, code is received in act 44. The code is a software program for execution on one or more devices. The code represents the implementation by a programmer or programming team of the designed architecture. During the implementation phase, the code is created that should conform to the architecture and design. The implementation is for part or all of the architecture. Different parts of the program may be tested separately, so may be received separately.

The code is received by upload, download, transfer, or other access to storage of the code. The code itself is received by a processor or memory. Alternatively, a flag or other indication of availability of the code is received. In one embodiment, the code is received by "checking-in" the code as part of a programming workflow. When a programmer completes a project, desires comments, wants checking, or is finished working on the program, the program as it exists may be checked-in. A processor, such as a server or database, receives the code by reference to a storage location or by copying to a database.

The decisions may be tested throughout the system's development lifetime. Whenever a change is made to the software, the effect of the change in code has on any associated architectural decisions may be tested. The effect on other decisions may be tested.

The code is received, in part, for automatically verifying architecture. The architecture decisions as implemented are inspected and measured to determine their affects and outcomes. Once the architecture is verifiable by automation, the programming of the architecture as designed may be governed. The implementation may be improved based on the produced evidence.

Architecture descriptions may include a number of diagrams plus descriptive text. Using the broken-down design decisions, the concepts and decisions may be verifiable. The tests for performing this verification are configured in a rules engine. The rules engine is executed against the received code to detect deviation from the designed architecture.

In act 46 of FIG. 1, the architecture of the code is tested for compliance with the architectural design specifications. A processor is configured to execute the rules engine against the program. The rules engine tests the code for compliance with the architectural decisions.

The rules engine helps monitor and manage architectural decisions made through the project's lifetime. Once the static representations of the system's architecture have been designed, either automatically or manually, the rules engine is created. Using the rules engine, it may be possible to monitor the different aspects, over time, as the software changes. Rules are executed to verify the compliance, or non-compliance, of the different elements of the code with the architectural models.

The testing is performed when triggered. For example, the rules engine is executed whenever code is checked-in. As another example, the rules engine is executed when a programmer activates, such as to test the code against the architecture design after completing a change or adding a new block of code. In other embodiments, the testing is performed periodically, such as once a day.

To test, the rules are applied to the code. A given rule may be applied to all the lines of code or a sub-set of the code. For example, the rule is associated with a given component. The rule may search for a component label in the code. The rule is applied to the code block associated with the label. Other searching or limitation of comparison may be used.

In one embodiment, adapters extract various types of information from the code, from the original architectural model, or other sources and store this intermediate information in a data store. Examples for this intermediate information are dependency graphs, call graphs (from executions), and/or results from other code checkers. The rules may be applied to this intermediate information. It may be easier to write rules against this pre-processed, intermediate information than against the code. Much required information for verification may not be readily in code and requires algorithms to extract. Some information may only be available at runtime of the code and cannot be extracted by static analysis, so output from other tools is also used for rules verification. Combinations of adapters and application of rules against the code may be used.

The rules compare different aspects of an architecture of the program to an expected architecture. For example, the rules test for layering dependencies, abstraction, skipping, cyclical dependencies, class breadth, and a combination of calling and being called a threshold number of times. Any rules and corresponding testing may be used. The rules may be applied separately for different categories or tree-branches of the architectural design. The rules may be applied together. Rules may test for a single or multiple aspects of the architecture.

In one embodiment, rules are applied to test for a plurality of architectural characteristics of the architectural design specifications. For example, the rules engine in a given instance tests for two, three, or more of classification, layering, abstraction, components, authentication, and links characteristics.

In the example system represented in FIGS. 2-5, an example of an architectural decision is the use of object-relational mapping to handle all database management and access. This is an abstraction for converting data between incompatible types of systems. The architectural decision to implement this concept may, for example, be to use Hibernate or some other OR mapping component to facilitate this mapping. This abstraction encapsulates all SQL queries within libraries, and as a result no SQL queries are needed within the application code. The corresponding rule tests the code and verifies that there are no direct SQL queries to the database. If any are found, then the architecture decision is not being satisfied and the rule has been broken.

In act 48, the results of the testing are output. The output is only of the violations. In alternative embodiments, the output is the results of the testing regardless of deviation or not from the architecture. Where the rule determines a binary violation or no-violation, the result is output as either. Where the rule performs another measure, such as a count of calls, additional information may be output. For example, complexity is tested by a rule for counting lines of text associated with a given classification or other category. The violation or not of the rule may be output (e.g., surpassing a threshold count) as well as the count itself.

The portions of the program violating or passing the rules may be output. For example, the code block violating a rule is identified with the output of the rule. The portion of the program violating a given rule is indicated. Architectural issues and bugs may be traced to specific portions of the code.

The results are stored in memory. The rules, tested parts of the code, and other information associated with the testing may be stored in persistent storage for later analysis. The identity of the parts of the code tested with specific rules may be stored. The architectural violations may be indexed by code line or block, by rule, or by both code and rule. Where priorities are assigned to different rules, the priority may be used to index the results of the testing.

The rules engine is a standalone program, utility or tool, or it may be integrated into other tools, such as integrated development environments or continuous integration environments. The output and result storage may be included or may be performed by separate programs. Rule creation may be included or may be performed by separate programs.

In one embodiment, a dashboard or program is included for various architectural compliance monitoring functions. The dashboard is a management tool for obtaining an overview or feedback about a status of a project. For example, the dashboard provides for input and/or guidance to create and/or configure architectural design decisions and corresponding rules. Processes, selections, or other facilities for guiding the architectural design or importing a previous design are provided. Output reports or formatting of compliance information is provided. The dashboard is a tool for displaying architectural indicators or information in a user-interface format.

The dashboard provides networked access. Different members of the architectural team and/or programming team may access the dashboard for reference. The dashboard may include or is associated with check-in or other group programming controls. Alternatively, the dashboard is a local program run on personal computers or workstations with or without access to a database, network, and/or other reference.

The dashboard facilitates implementation of evidence-based architecting. Creation or design of the architecture is facilitated using the dashboard. The architects make and manage their architectural decisions using the dashboard. The architects create and implement the rules that govern the decisions using the dashboard. Selections, configuration, and/or templates for creation may be guided or assisted by the dashboard. The architects use the dashboard to add organization and project-specific rules and metrics.

The dashboard or user interface may provide generic functionality. The various concepts, requirements, and/or decisions for different types of software development projects are indicated. For developing a specific project, the user configures the generic functionality.

The dashboard or user interface may provide adaptive functionality. The architect may be guided in creating project-specific concepts, requirements, and/or decisions. The created information may be added for configuring the rules engine.

The dashboard may include reverse engineering functions or may otherwise allow import of architectural information. For example, an existing program is reverse engineered and resulting detected architectural information is provided. The dashboard may provide for assignment of rules based on the detected architecture. The assignment may be assisted by automated generation of some or all of the rules associated with a detected architecture. The architects for another program may start with the detected architecture and corresponding recommended rules to create a new architecture and associated rules.

For implementation of a designed architecture, the dashboard assists in monitoring generic architectural aspects of a software system. The dashboard provides a graphic representation of the architecture for managing and monitoring.

Figure 6:
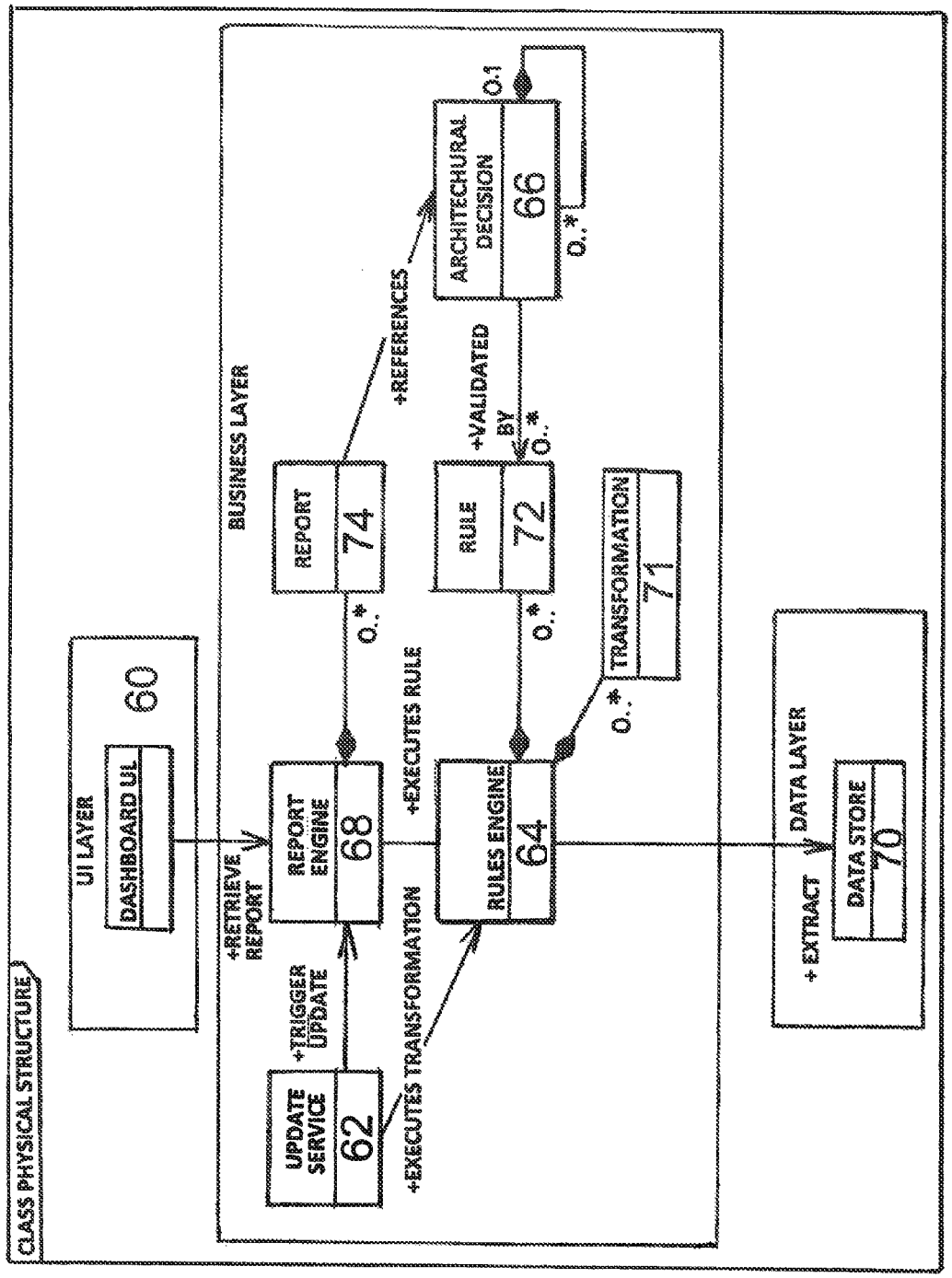
FIG. 6 is a conceptual view of the concepts, which are embodied in a rules engine for governing software architecture.

Only the creation, only the monitoring, or both creation and monitoring functions are provided by the dashboard. The dashboard may include a plurality of different components. FIG. 6 shows one embodiment of a classification physical structure architecture for the dashboard. For example, the dashboard includes user interface 60, update service 62, rules engine 64, architectural decision 66, reports engine 68, and a data store 70. Additional, different, or fewer components may be provided.

The user interface component 60 displays the relevant architectural views of the software being designed and/or implemented. The results of executed rules and measures may be displayed. The user interface component 60 may include selections, lists, or configuration utilities for rules configuration. Activation and associated configuration inputs for other relevant metrics and statistics of the code base may be provided.

The update service 62 is a data aggregation component. The raw incoming information from the software is processed. Version comparison, check-in, or other processes related to updating the design, decisions, and/or code implementing the architecture may be managed by the update service 62. Additional information for output or testing may be derived by the update service 62. For example, dependency information, differences, or other information used for testing may be updated. Additional, project-specific data processing operations may be performed as part of the updating service 62.

The rules engine 64 contains the logic for testing for derivation. The rules engine 64 includes configurable rules 72. Generic rules for selection and configuration for a given project may be included. Utilities for the addition of project-specific rules or creation of new rules may be included. The rules 72 are generated based on the architecture decisions 66. The rules 72 are collected and applied to code to validate the architecture decisions of the system as implemented.

The transformation 71 represents transformation of a generic rule into a specific application for a given system.

The architectural decisions component 66 contains the decisions extracted from the system's architecture and/or architects. These decisions are used to compose the rules 72. The decisions may be referenced by the reports 74 to semantically explain changes to the system's architecture or reasons for the architecture as designed.

The reports engine 68 creates and compiles one or more reports 74 of the results of the execution of the rules across the system's software and corresponding architecture as implemented. The architectural models representing the architecture as designed are stored and may be used to generate a static display, such as a component and link diagram or a list of concepts, requirements, and/or decisions. The reports engine 68 may show how these models change as the architecture decisions change. The reports engine 68 may show deviation of the architecture as implemented from the architecture as designed. The output from execution of the rules, such as the results of the rules that are not explicitly tied to the graphical model of the system, is displayed.

The data store 70 manages memory or storage of data used by the dashboard. Common data is extracted from the source code and other available artifacts. The concepts, requirements, design decisions, comments, rules, output of application of rules (e.g., artifacts), data extracted from source code (e.g., tested code blocks, version information, or code associated with non-compliance), graphic representations, lists, other architectural compliance information, or combinations thereof are extracted and stored.

The architecture dashboard obtains information pertaining to the software from one or more sources. A configuration management system may store the software and perform mature configuration management and version control on the software. The configuration management system may use other tools that take information from the software and may perform operations and analysis relevant and useful to the dashboard. The dashboard may access the configuration management system for any of this information or includes the configuration management system. Alternatively, the dashboard operates without the configuration management system.

Data may be obtained from adapters. Adapters import data from various sources into the data store and optionally preprocess this data. This input data is the "will" information, design decisions and architectural models created by the architects how the system is to be built, and/or is the "is" information, information about how the system actually was built. Rules compare the "will" against "is" data to make a meaningful pass/fail statements.

Example data in addition to architectural-related information is data from release notes or a content management system. Another example is data from an architecture recovery workbench (ARW) or other architecture reverse engineering system. An architectural model and static dependency information are extracted from code by reverse engineering of the code. The ARW may generate certain views of the system, such as call graphs, dependency models, and layering views. The ARW information represents the architecture detected from the implementation. In another example, data from code inspection is provided. A tool automatically analyzes the quality of the software. The code may be checked against a set of standards and metrics. Coding standard violations that are deemed architecturally significant may be extracted.

These tools accessed by or included in the dashboard may assist with the creation or compliance monitoring of the architecture models. The data from these tools may be used in the rules of the rules engine.

Figure 7:
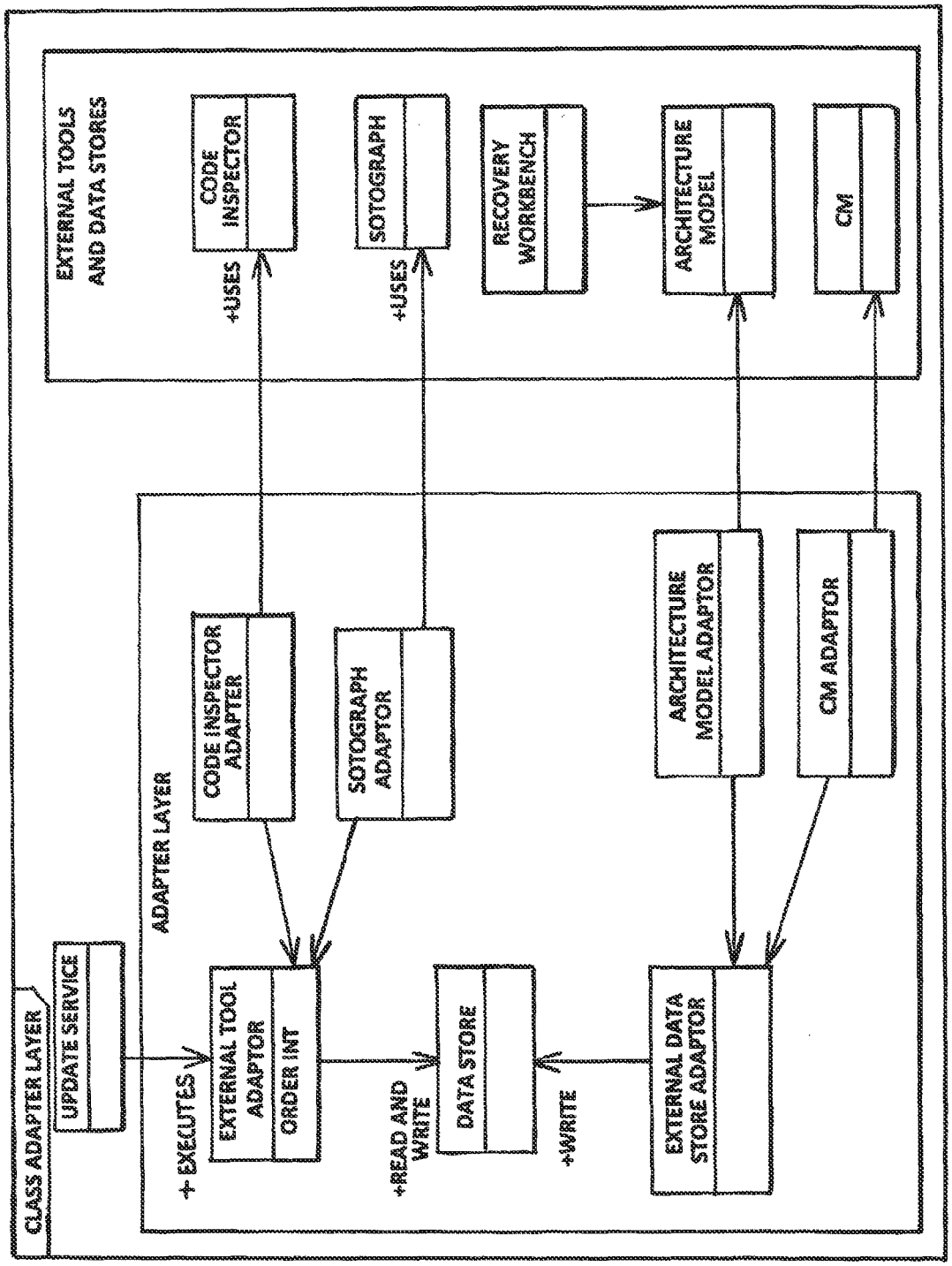
FIG. 7 is a block diagram of one embodiment of adaptors for acquiring data from input code for further processing by the rules engine for governing software architecture.

FIG. 7 shows an architecture of an adaptor layer for the rules engine. The adaptor layer represents how the rules engine obtains information pertaining to the software to be designed and monitored. Each of these external tools has adapters that integrate the tools into the rules engine. In this way, the tools may be configured to operate and provide the relevant information to create and maintain the architecture model of the system and to analyze the software to check the rules and in turn verify the architecture decisions. Additionally, different, or fewer components may be used.

The dashboard generates displays to assist the architects and/or programmers. The displays support architecture creation, rules generation and/or monitoring of compliance.

The display may include one or more representations of the architecture as designed. For example, a graphic showing layering, components and links, data, or other architecture is generated. For example, one or more of the graphics represented in FIGS. 2-4 are displayed. In other embodiments, a list of concepts, requirements, and/or decisions is displayed. Lists for different categories may be displayed. Lists of architecture design decisions may be displayed. Lists of rules for the design may be displayed. Any representation of the architecture as designed may be used. The architecture as existing at a given time is represented.

As the architecture changes over time, the changes to the architecture as designed may be tracked. Any comments or reasoning associated with change in architecture may be recorded and displayed. In one embodiment, the changes are represented. For example, any changes may be represented by color coding or strikeout and underlining. The tracking may allow the architects to re-configure the rules engine based on changes. Rules for selection or configuration may be presented to allow the architect to configure the rules engine to conform to the current architecture.

The changes to the architecture may be tracked. Measurable parameters determine the relevance and impact of change, such as how often a component changes and/or a degree of the change. The change of the design is highlighted.

Outputs for monitoring may be provided. The dashboard uses the rules engine. The rules engine monitors architectural aspects of the code to compare reality with what is expected from the system's architecture description. The output is used to represent deviation of the architecture. Changes violating rules are displayed and changes not violating rules are not displayed. Evidence, including code and the results of executing the rules, are extracted to represent mismatches between the reality and what is expected. Since many decisions are made throughout the design of the system's architecture, the decisions are linked to the system's code. The code may be verified by repeatedly running the rules as the design and software change.

The rules are applied once or periodically run across the architecture and the code. The results are presented to the architects or programmers. The relevant elements of the architectural views and other aspects of the architecture that change are presented in a useful and meaningful fashion. The actual architecture is compared to the expected architecture to determine the differences. Aspects such as architectural drift, high ranked elements that changed, and/or consequences of change may be examined and statistics presented on the dashboard.

In one output, a list is generated. Once a rule is broken, this fact is presented to the architect on the dashboard. The list includes the rules that have been broken or includes all rules with highlighting for the broken rules.

The list may include other information. Links to the changes and the reason for the change associated with the violation are provided. In this way, the architect is able to investigate the changes, and determine their validity and impact on the rest of the system's architecture and software. Additional, different, or less information may be provided in the list.

FIG. 8 shows an example list. The list shows rules associated with violations. Other rules may be shown. The list provides information identifying the part of the code violating the rule. Line numbers are shown, but other citations may be provided. For example, the section, code block, or other identified is used. This identification is a link to the part of the code. An active link may be provided, such as a clickable or selectable link to navigate the user directly to the code. Alternatively, passive linking is provided by the indication of information.

A statistic associated with the violation, part of the code, and/or rule may be provided. In the example of FIG. 8, the statistic is for the rule. The number of other violations of the rule, either for a given code version or over multiple versions, is provided. Other statistics may be provided, such as frequency of violation. Other information may be provided, such as a ranking of importance of the rule, the programmer associated with coding the violation, or an excerpt of the code associated with the violation.

Rather than or in addition to the list, the dashboard outputs a graphical representation of the architecture as implemented compared with the architecture as designed, or vice versa. Using modeling techniques and representations familiar to the software's architects, the architecture as implemented may be displayed graphically. For example, an architecture recovery engine (e.g., architecture recovery workbench, such as the Four View Model from Siemens) draws static models of the system's architecture showing one or more architectural viewpoints graphically. For displaying the architecture as designed, any graphics generated as part of or from the concepts, requirements, and/or design decisions are used.

The dependencies between components of the architecture may be graphically represented. The dependencies between the different elements of the software are presented to the architect. The dependencies are represented in one or more types of architectural models. Class, component, layering and/or other architectural models are presented.

For example, a logical view of the architecture is presented on the dashboard. A component and connector diagram presents each of the architectural elements as components and interfaces as connectors. This diagram may highlight aspects of a good architecture, such as separation of concerns and coupling, and cohesion. Additionally, the important information of the architecture, such as interface changes, class associations and connector types, may be shown.

If a client-server architecture has been chosen, the client-server aspects may be represented graphically on the dashboard. The logical view represents the client-server deployment of the system.

Other views than the logical view may be used. For example, the graphic is of an execution view. The deployment view of the architecture may be augmented with an execution view. The execution view shows mapping of the functionality to runtime platform elements, such as processes and shared libraries. The execution view may help with understanding of the runtime aspects of the system.

In another example, the graphic is of a data model view. The data model view indicates the data schema. The database schema may be graphically represented as a list of tables and the relationships between them.

The architect may edit the graphical representation. For example, additional information is added to the layering extracted from the code using an architecture recovery tool.

The results of the application of the rules may feed into the displayed architectural model. Violations are highlighted. Where the architecture as designed is displayed, any component, link, layer, or other part of the architecture associated with a violation is highlighted. The deviation may be displayed, such as adding links, components, layers, or other architectural pieces showing the added or missing piece. The display may be layered, such as cycling through the architecture as designed, the architecture as implemented, and a combination of both.

Highlighting may be by color coding. Flashing, dashed lines, or other indicator of violation may instead or additionally be used. The highlighting indicates the difference in the architecture in an image. FIG. 9 shows an example image. The image includes a component and link view of a simple architecture. This graphical view is an architectural model. The user interface (UI) is to communicate with an image process. The image process is to communicate with the data access, such as for acquiring image data to process. A rule may be that the UI does not communicate with the data access component, classification, or layer. The rule is violated, such as a call for data access being included in the UI component, classification, or layer.

To highlight this difference between the architectures (as designed and as implemented), a link between the UI and the data access is added. The link is highlighted by being displayed differently than other links. In the example of FIG. 9, the link is shown as a dashed line. The architect or programmer may view the image of the architectural model and determine that the code as programmed violates the architecture and in what way.

The architect or programmer may review the code for the UI and/or data access components to identify and fix the violation. Alternatively, the graphic link may be selectable to navigate to the code that was detected as violating the rule. The architect or programmer may fix the violation or may redesign the architecture and reconfigure the rules to remove the violation and highlighting.

Information about the violation or a link to such information may be presented on the graphic. For example, the changes to the software resulting in a violation are provided. As another example, an arrow indicates or other highlighting indicates the component with the code using a link that is a violation. The graphic with the highlighting provides an overview of relationships between the pieces of the architecture and violations.

The highlighting isolates architecture associated with violations. Using the linked violation information, the architect or programmer may analyze the changes or addition to the code causing the violation. Text or graphic representation on the component, link, layer or other graphic for the architecture may provide further information about the violation, such as a link to the part of the code associated with the violation.

The graphical representation is free of a list of the results of rules violation. For example, the graphic model of the architecture of FIG. 9 does not include the list of FIG. 8. In other embodiments, violations of one or more rules are not represented in the graphical model. For example, a rule indicating a total length of the entire code is not represented. The violations not represented in the graphical model may be provided in a same image or report (tabs or other multiscreen display) as a list. In yet other embodiments, a list provided with the graphical model includes violations and rules represented in the graphical model.

The output (e.g., list and/or graphical model) indicates differences between the architecture as designed and the architecture as currently implemented. In other embodiments, the differences are between other architectures. For example, version 1 of the code is tested and any violations indicated in the output. Version 2 may be tested. The output is for differences between versions 1 and 2, not the differences of version 2 with the architecture as designed. A separate graphical model may be generated for different images or a same report comparing a different combination the architecture implemented by the code and/or architecture as designed (e.g., another image of the model for version 2 to version 3 differences and an image of the model for architecture as designed and version 3 differences).

The violations may be tracked over time. A same violation may occur for different versions. Such violations may be highlighted differently, indicating continuing violation in the graphical model or list. Violations that have been solved may be displayed differently, such as showing planned elements in green, fixed elements in blue, and elements associated with a current violation in red. Flashing red may be used for violations occurring over multiple versions. Other highlighting may be used.

The tracking may provide a historical perspective on the architecture as implemented. A sequence of images may be generated to show violations over time. The architect may redesign due to repeated violations. The programmers may be reminded to focus on a particular problem where repeated violations are shown.

The display for architecture monitoring may include other components. High traffic code blocks may be indicated, such as based on the number of calls. Ranking mechanisms may separate changes that are most likely architecturally significant from the noise of small, local changes. The ranking may be determined as part of creating the architectural design decisions. Default criteria may be applied, such as data access related rules having a greater ranking than data export rules. The user (e.g., architect or programmer) may set the rankings. The ranking is relative between changes to architecture (relative between rules or corresponding design decisions).

Statistics associated with violations may be provided. Changes to the code may result in violation. The violation of a rule indicates a change in the architecture due to the implementation. The statistic may be associated with the changes. For example, the number of times a given violation occurs in one version and/or over time is calculated. The distribution of violations over time, function, classification, layer, or other division of code may be determined, and a statistic reflecting the distribution may be shown. A statistic associated with a plurality of rules may be calculated, such as a percentage of rules violated by a given version.

The output, such as an image with a graphical model and/or list, may include the rank information. For example, the list of violations is ordered by rank. As another example, a width or shade of a graphic indicates the ranking. The output may include the statistic or multiple statistics. FIG. 8 shows the statistic as part of the list. A separate statistic may be provided. The graphical model may include the statistic, such as providing text or by changing a graphic element based on the statistic (e.g., a link associated with a greater number of violations over time or in a version highlighted differently).

The syntaxes and semantics of architectural elements may be displayed. Component definitions and interfaces are displayed as syntax. Internal behavior is displayed as semantics. The changes to syntax and/or semantics may be displayed.

Snapshots of the software's architecture as implemented may be displayed. In addition to or alternative to display of the architecture as designed, the architecture as implemented may be displayed. Changes overtime may be tracked and used in the display. Metrics representing the amount, frequency, or other characteristic of change may be output. Static monitoring of the architecture may be provided by displaying the architecturally relevant issues and changes as seen from the different viewpoints onto the code base. Monitoring and measuring of the impact change has on the architecture over time may be provided. By applying the rules engine, the display may indicate whether the implementation is following the architecture design. Architectural aspects, such as interface changes, cross impact factors, services, object references, component changes and impacts, layers, static dependencies, or others, may be assessed.

When automatic evaluation of the architectural decisions is not possible, a warning or list may be provided. For example, changes to the interfaces may not be graphically represented. The changes associated with violation may be shown in a list.

FIG. 10 shows one embodiment of a system governing software architecture as designed. The system is a host computer, server, workstation, personal computer, and/or network for monitoring and/or designing software architecture. The system includes a processor 30, a memory 32, and a display 34. Additional, different, or fewer components may be provided. For example, a user input device is provided.

The memory 32 is an external storage device, RAM, ROM, and/or a local memory (e.g., solid state drive or hard drive). The memory 32 may be implemented using a database management system (DBMS) managed by the processor 30 and residing on a memory, such as a hard disk, RAM, or removable media. Alternatively, the memory 32 is internal to the processor 30 (e.g. cache).

The memory 32 stores code for testing. The code programmed to implement at least part of the software architecture as designed is stored. The code is source code. The code may define inputs, outputs, data access, user interlace, operation, and/or other aspects of any system.

The memory 32 stores one or more rules. For example, the memory 32 stores the rules engine with configured rules for a given architecture as designed. The rules for testing classification, layering, abstraction, components, links, and/or other characteristics of the software architecture as designed are stored. The generic rules, rule templates, or rule building information may be stored. The results from application of the rules to the code may be stored.

The memory 32 stores instructions for implementing the rules engine and/or the dashboard. Instructions for governing software architecture as designed are stored in the non-transitory memory 32. The same or different computer readable media may be used for the instructions and other data. The instructions, user input, rules, and/or other information are stored in a non-transitory computer readable memory, such as the non-transitory memory 32. The instructions for implementing the processes, methods and/or techniques discussed herein are provided on computer-readable storage media or memories, such as a cache, buffer, RAM, removable media, hard drive or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

In one embodiment, the instructions are stored on a removable media device for reading by local or remote systems. In other embodiments, the instructions are stored in a remote location for transfer through a computer network. In yet other embodiments, the instructions are stored within a given computer, CPU, GPU or system. Because some of the constituent system components and method steps depicted in the accompanying figures are implemented in software, the actual connections between the system components (or the process steps) may differ depending upon the manner in which the present embodiments are programmed.

The processor 30 and/or memory 32 are part of a computer, personal computer, server, workstation, network processor, or other now known or later developed processing system. Various peripheral devices such as, for example, the display 34, a disk storage device (e.g., a magnetic or optical disk storage device), a keyboard, a printing device, and a mouse, may be operatively coupled to the processor 30. A program may be uploaded to, and executed by, the processor 30 comprising any suitable architecture. Likewise, processing strategies may include multiprocessing, multitasking, parallel processing and the like. The processor 30 is implemented on a computer platform having hardware, such as one or more central processing units (CPU), a random access memory (RAM), and input/output (I/O) interface(s). The computer platform also includes an operating system and microinstruction code. The various processes and functions described herein may be either part of the microinstruction code or part of the program (or combination thereof) which is executed via the operating system. Alternatively, the processor 30 is one or more processors in a network.

The computer processing performed by the processor 30 may be implemented in various forms of hardware, software, firmware, special purpose processors, or a combination thereof. Some embodiments are implemented in software as a program tangibly embodied on a non-transitory program storage device.

The processor 30 is configured by software and/or hardware to receive input of architectural characteristics. The input may be guided, such as providing for user selection, or automated, such as generating architectural characteristics by analysis. The processor 30 selects the rules as a function of the input. Decisions or other architecture design indicates rules to be used. The pre-configured or user configured rules associated with the decisions are selected by the processor 30.

The processor 30 is configured to apply the rules to the code. The application occurs in response to user request, periodically, in response to a trigger (e.g., check in of software), in response to a change in the code, or for other reasons.

The processor 30 tests the code for differences between the software architecture as designed and the software architecture as implemented in the code. By applying the rules, code violations of the designed architecture may be detected. Differences in classification, layering, abstraction, components, links, an authentication characteristic, other categories of software architecture, or combinations thereof are identified. By applying the rules, binary pass or fail of decisions related to one or more categories is indicated. Failure of the code to satisfy the rule indicates deviation from the designed architecture. Passing of the code indicates satisfaction of the rule or compliance of the architecture as implemented in the code with the designed architecture, at least for tested decisions.

The processor 30 is configured to record, in the memory 32, which rules have been applied, which parts of the code have been tested using which rules, and the results of the testing. Other information may be stored, such as change in the code from one version to the next, measures used or obtained by application of the rules, or results of testing of code blocks for programming performance.

The processor 30 generates output based on the testing. The user interface for the dashboard, reports, architectural models, lists, or other information are formed into one or more images.

The display 34 is a CRT, LCD, projector, plasma, printer, touch screen, or other display for displaying the options available in the engineering system. For example, the display 34 displays the reports (e.g., lists and/or graphical representations of architecture). The display 34 may be part of the user interface for the dashboard, architecture creation, and/or monitoring of architecture implementation.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system for governing software architecture as designed, the system comprising:
   a memory operable to store code and a plurality of rules, the rules corresponding to classification, layering, abstraction, components, and links characteristics of the software architecture as designed, the code programmed to implement at least part of the software architecture as designed; and
   a processor configured to apply the rules to the code, the application testing the code for differences from the software architecture as designed and the software architecture as implemented in the code, such that the testing comprises testing for directional layering dependencies by identifying a layer hierarchy and testing for forbidden communication between layers of the hierarchy, abstraction skipping, cyclical dependencies, class breadth, and a combination of calling and being called a threshold number of times, and indicating portions of the program violating the rules.

2. The system of claim 1 wherein the processor is configured to receive input of the characteristics and select the rules as a function of the input.

3. The system of claim 1 wherein at least one of the rules comprises an authentication characteristic.

4. The system of claim 1 wherein the processor is configured to indicate a binary pass or fail decision as an output of the testing for each of the rules.

5. The system of claim 1 wherein the processor is configured to record in the memory which parts of the code are tested with which ones of the rules.

6. The system of claim 1 wherein the classification characteristic comprises a functionality of a block of code and a corresponding one of the rules tests for a number of calls outside the functionality of the block of code.

7. The system of claim 1 wherein the layering characteristic comprises a direction of communications and a corresponding one of the rules tests for violations of directional interlayer dependency.

8. The system of claim 1 wherein the abstraction characteristic comprises a database mapping and a corresponding one of the rules tests for calls to a database not using the database mapping.

9. The system of claim 1 wherein the component characteristic comprises a code blocking and a corresponding one of the rules tests for size, coupling, complexity, usage, or duplication of code blocks.

10. The system of claim 1 wherein the link characteristic comprises a communications channel and a corresponding one of the rules tests for interfacing between components.

11. The system of claim 1 wherein the processor is configured to perform the application testing in response to a change in the code.

12. The system of claim 1 wherein the memory is further operable to store a snapshot of a previous version of the code, and the processor is further configured to compare the identified differences to the snapshot and indicate changes that have occurred since the snapshot.

13. A method for governing software architecture as designed, the method comprising:
    receiving artifacts representing a software program to be verified;
    storing the program and a plurality of rules, the rules corresponding to classification, layering, abstraction, components, and links characteristics of the software architecture as designed, the program comprising code programmed to implement at least part of the software architecture as designed;

testing, with a processor, the artifacts against an architectural specification using a set of rules wherein the testing comprises testing for directional layering dependencies by identifying a layer hierarchy and testing for forbidden communication between layers of the hierarchy, abstraction skipping, cyclical dependencies, class breadth, and a combination of calling and being called a threshold number of times;

outputting a result of the testing.

14. The method of claim 13 wherein the testing comprises testing for a plurality of architectural characteristics of the architectural design specifications, represented as rules.

15. The method of claim 13 further comprising:
receiving, by the architectural rules engine, the architectural design specifications; and
configuring the architectural rules engine as a function of the received architectural design specifications.

16. The method of claim 15 wherein the architectural design specifications are broken down into architectural design decisions associated with available rules of the architectural rules engine, and wherein receiving the architectural design specifications comprises selecting and configuring of the rules for the architectural design decisions.

17. The method of claim 16 wherein receiving the architectural design specifications comprises receiving the architectural design decisions for different concepts and at least one of the concepts includes multiple instances.

18. In a non-transitory computer readable storage medium having stored therein data representing instructions executable by a programmed processor for governing software architecture as designed, the storage medium comprising instructions for:

receiving a program;

storing the program and a plurality of rules, the rules corresponding to classification, layering, abstraction, components, and links characteristics of the software architecture as designed, the program comprising code programmed to implement at least part of the software architecture as designed;

executing rules against the program, the rules comparing different aspects of an architecture of the program to an expected architecture, wherein executing the rules comprises testing for directional layering dependencies by identifying a layer hierarchy and testing for forbidden communication between layers of the hierarchy, abstraction skipping, cyclical dependencies, class breadth, and a combination of calling and being called a threshold number of times; and indicating portions of the program violating the rules.

19. The non-transitory computer readable storage medium of claim 18 wherein receiving the program comprises receiving an indication of a trigger event, and wherein executing comprises executing as part of the check-in.

20. The non-transitory computer readable storage medium of claim 18 further comprising:
receiving the expected architecture as a plurality of design decisions and architecture models; and
configuring the rules as a function of the design decisions.

* * * * *